(12) United States Patent
Rhett et al.

(10) Patent No.: US 12,703,136 B2
(45) Date of Patent: Aug. 11, 2026

(54) METHOD AND EXTRUSION DIE FOR MAKING A STRUCTURING FABRIC

(71) Applicant: Voith Patent GmbH, Heidenheim (DE)

(72) Inventors: Rowe Rhett, Vicksburg, MS (US); Paul Raymond Riding, Lancashire (GB); Uwe Köckritz, Heidenheim (DE); Craig Davis, Crystal Springs, MS (US); Matt Waddle, Flowood, MS (US)

(73) Assignee: Voith Patent GmbH, Heidenheim (DE)

( * ) Notice: Subject to any disclaimer, the term of this patent is extended or adjusted under 35 U.S.C. 154(b) by 92 days.

(21) Appl. No.: 18/442,347

(22) Filed: Feb. 15, 2024

(65) Prior Publication Data

US 2024/0269910 A1 Aug. 15, 2024

Related U.S. Application Data

(60) Provisional application No. 63/485,062, filed on Feb. 15, 2023.

(30) Foreign Application Priority Data

Apr. 5, 2023 (EP) .................................... 23166781

(51) Int. Cl.
*B29C 48/345* (2019.01)
*B29C 48/05* (2019.01)
(Continued)

(52) U.S. Cl.
CPC ............ *B29C 48/345* (2019.02); *B29C 48/05* (2019.02); *B29K 2033/08* (2013.01);
(Continued)

(58) Field of Classification Search
CPC .... B29C 48/345; B29C 48/05; B29C 48/0014
See application file for complete search history.

(56) References Cited

U.S. PATENT DOCUMENTS 3,758,247 A * 9/1973 Deegen ............... B29C 48/0014 425/114
6,358,594 B1 3/2002 Ampulski
(Continued)

FOREIGN PATENT DOCUMENTS

DE 102013202358 A1 8/2014
EP 3401078 A1 11/2018
(Continued)

*Primary Examiner* — Seyed Masoud Malekzadeh
(74) *Attorney, Agent, or Firm* — Laurence A. Greenberg; Werner H. Stemer; Ralph E. Locher

(57) ABSTRACT

An extrusion die makes a structuring fabric which has structuring-beads resting on sublayer-beads. The extrusion die has a flat first surface and a flat second surface, the first and second surfaces contact each other along a contact line. The first and second surfaces are inclined with respect to each other. The first surface has a first nozzle of a pair of nozzles for extruding a sublayer-bead and the second surface has a second nozzle of the pair of nozzles for extruding a structuring-bead on top of the sublayer-bead. The first nozzle has a substantially rectangular shape and the second nozzle has a shape that resembles a square with all four side edges bulged inwardly. Both the first nozzle and the second nozzle are located in close proximity to the contact line. The first nozzle has a first symmetry axis that is perpendicular to the contact line.

8 Claims, 3 Drawing Sheets

(51) Int. Cl.

| | |
|---|---|
| *B29K 33/00* | (2006.01) |
| *B29K 75/00* | (2006.01) |
| *B29K 83/00* | (2006.01) |
| *B29K 105/08* | (2006.01) |
| *B29L 31/00* | (2006.01) |

(52) U.S. Cl.

CPC ...... *B29K 2075/00* (2013.01); *B29K 2083/00* (2013.01); *B29K 2105/0845* (2013.01); *B29L 2031/726* (2013.01)

(56) References Cited

U.S. PATENT DOCUMENTS

| | | | | |
|---|---|---|---|---|
| 9,242,419 | B2 * | 1/2016 | Morris | B29C 48/11 |
| 11,578,429 | B2 * | 2/2023 | Angelico | D04H 1/565 |
| 2014/0001671 | A1 * | 1/2014 | Morris | B29C 48/11<br>425/113 |
| 2014/0035190 | A1 * | 2/2014 | Morris | B29C 48/157<br>264/177.1 |
| 2019/0136097 | A1 | 5/2019 | Kutter et al. | |

FOREIGN PATENT DOCUMENTS

| | | | |
|---|---|---|---|
| WO | 0014328 | A1 | 3/2000 |
| WO | 0075424 | A1 | 12/2000 |
| WO | 2013032683 | A2 | 3/2013 |
| WO | 2018146620 | A1 | 8/2018 |

* cited by examiner

METHOD AND EXTRUSION DIE FOR MAKING A STRUCTURING FABRIC

CROSS-REFERENCE TO RELATED APPLICATION

This application claims the benefit, under 35 U.S.C. § 119, of U.S. provisional patent application No. 63/485,062, filed Feb. 15, 2023 and of European patent application No. EP 23166781.7, filed Apr. 5, 2023; the prior applications are herewith incorporated by reference in their entireties.

FIELD AND BACKGROUND OF THE INVENTION

The invention concerns an extrusion die for making a structuring fabric. A structuring fabric, sometimes also called "structured fabrics" or "molding fabrics", is a fabric configured for use in a machine to produce a structured fiber web, such as a bulky tissue web. The structuring fabric usually has a woven base fabric and a plurality of structuring-beads of polymeric material extruded on top of the woven base fabric. The structuring-beads need to be of a certain minimum dimension to be suitable of imparting a visible structure into the fiber web produced thereon. The structuring-beads should have a substantially square cross-section of at least 0.25 mm×0.25 mm, better at least 0.5 mm×0.5 mm. Furthermore, the invention concerns a method of producing such a structuring fabric by using the extrusion die.

To use an extrusion die to produce extruded structuring-beads as part of a structuring fabric is already known.

International patent disclosure WO 00/75424 A1, corresponding to U.S. Pat. No. 6,358,594, discloses the use of an extrusion die to produce such a structuring fabric for making strong, soft, absorbent paper products. The content of WO 00/75424 A1 is incorporated herein by reference. This document teaches to extrude a fluid resinous material onto a reinforcing element, such as a woven fabric, according to a desired predetermined pattern and then solidifying the patterned resinous material. After solidification the resinous material adheres to the reinforcing element.

FIG. 1A shows two extrusion dies 22 disclosed in international patent disclosure WO 00/75424, each of which contains several nozzles for extruding structuring-beads 14 onto a woven base fabric 12. During the extrusion process, the woven base fabric 12 is moved in a moving direction v relative to the extrusion dies 22 and the extrusion dies 22 can be reciprocally moved in cross machine direction CD to obtain a wavy pattern of the structuring-beads 14.

A portion of such a structuring fabric 10 known from the prior art is shown in a cross-sectional view along the machine direction MD in FIG. 1B. A problem that can be observed with such a structuring fabric 10 is that the bonding of the extruded structuring-beads 14 to the woven base fabric 12 is sometimes insufficient. Especially if the structuring fabric 10 is circulated at high speeds in a corresponding web making machine and/or if high forces are applied to the structuring fabric 10, such as in a press nip, it can happen that the structuring-beads 14 peel away from the woven base fabric 12. The reason for this seems to be that the extruded structuring-beads 14 have only a very limited contact area with the web facing side 16 of the woven base fabric 12. In other words, the extruded structuring-bead 14 hardly penetrates the volume of the woven base fabric 12 in thickness direction TD from its upper, web facing side 16 towards its lower, machine side 18. Instead, it has only local contact to individual yarn knuckles on the web facing side 16 of the woven fabric 12.

Attempts to increase the contacting area by reducing the viscosity of the resinous material that form the structuring-beads were not successful because the lower viscosity adversely affects the dimensional stability of the structuring-beads. For obtaining a well visible pattern within the fiber web that is produced on the structuring fabric, the structuring-beads should have a substantially rectangular cross-section, wherein the sidewalls of the structuring-beads should be substantial perpendicular to the web facing surface of the woven fabric. However, this is difficult to achieve if the viscosity of the resinous material is reduced. The same is true if the still soft structuring-beads are forced into the woven base fabric e.g. by a calendaring device as proposed in WO 00/75424 A1.

SUMMARY OF THE INVENTION

It is an object of the present invention to provide an extrusion die that can achieve an improved structuring fabric with a strong bonding of the structuring-beads to the web facing side of the woven base fabric, while at the same time the dimensional stability of the structuring-beads is not adversely affected. It is another object of the present invention to provide a manufacturing process for such a structuring fabric by using the extrusion die according to the present invention.

The above-mentioned objects are achieved by an extrusion die for making a structuring fabric, according to the independent extrusion die claim, and by a method of procuring a structuring fabric by using such an extrusion die, according to the independent method claim, respectively. Advantageous embodiments are the subject-matter of the dependent claims.

In particular, the problem is solved by an extrusion die for making a structuring fabric having structuring-beads resting on sublayer-beads, the extrusion die containing a substantially flat first surface and a substantially flat second surface, wherein the first surface and the second surface contact each other along a contact line and wherein the first surface and the second surface are inclined with respect to each other. The first surface contains a first nozzle of a pair of nozzles for extruding a sublayer-bead and the second surface contains a second nozzle of the pair of nozzles for extruding a structuring-bead on top of the sublayer-bead. The first nozzle has a substantially rectangular shape and the second nozzle has a shape that resembles a square with all four side edges bulged inwardly, wherein both, the first nozzle and the second nozzle are located in close proximity to the contact line. The first nozzle has a first symmetry axis that is perpendicular to the contact line, and the second nozzle has a second symmetry axis that is perpendicular to the contact line, wherein the first symmetry axis and the second symmetry axis contact each other at the contact line.

The term "nozzle" in the sense of the present invention refers to the opening in the corresponding surface of the extrusion die through which opening a polymeric material can be extruded so as to for a corresponding bead of extruded material.

The term "in close proximity" in this context here means that the corresponding nozzle either directly touches the contact line at least in one point or that the distance between the corresponding nozzle and the contact line is very small. In particular, the distance of the first nozzle to the contact line may be smaller than 10%, preferably 5%, of the dimension of the first nozzle measured along the first symmetry axis and/or the distance of the second nozzle to the contact line may be smaller than 10%, preferably 5%, of the dimension of the second nozzle measured along the second symmetry axis. Anyhow, it is preferred that the first nozzle and the second nozzle do not touch each other. In other words, it is preferred that each nozzle is a discrete opening with its own closed circumferential edge.

The extrusion die according to the present invention provides several advantages over the extrusion die known from the prior art. Some of these advantages will be explained in more detail below.

By providing sublayer-beads below the structuring beads it is possible to significantly improve the strength of the bonding of the structuring-beads to the web facing side of the woven base fabric, without adversely affecting the cross-sectional shape of the structuring-beads. The sublayer-beads can protrude deeper into the volume of the woven base fabric to have a larger contact area with the yarns of the woven base fabric, while providing a good foundation for the structuring-beads that rest thereon.

By providing two discrete nozzles that do not touch each other, it is possible to provide two different beads, wherein the sublayer-bead is forced deeply into the woven base fabric, whereas the structuring bead is rather gently extruded on top of the sublayer-bead. This helps to not adversely affect the geometric form of the structuring-bead.

Furthermore, it was found out that the special shape of the second nozzle for extruding the structuring-bead, which shape is not rectangular, also helps to obtain structuring-beads with an almost perfect square cross-section. This is especially true if the polymeric material of the sublayer-beads is silicone, in particular a two-component silicone.

Providing the first nozzle and the second nozzle both in close proximity to the contact line and, thus, in close proximity to each other is very advantageous because:

a) the structuring-bead can be extruded onto the sublayer-bead at a time when the sublayer-bead is still sufficient soft to obtain a good bonding between the two beads, even if no particular pressure is applied on the structuring-bead;
b) the gap between the sublayer-bead and the structuring-bead during the extrusion process is kept very small, thus, avoiding air being trapped between the two beads which would adversely affect the bonding; and
c) if the extrusion die is moved in cross machine direction of the woven base fabric during the extrusion process to create e.g. a wavy pattern, such as shown in FIG. 1A, the close proximity of the two nozzles assures that the structuring-bead always perfectly rests on its corresponding sublayer-bead.

Preferably, the first nozzle has a third symmetry axis that is parallel to the contact line and the second nozzle has a fourth symmetry axis that is parallel to the contact line. More preferably, the dimension of the first nozzle measured along the third symmetry axis substantially corresponds to the dimension of the second nozzle measure along the fourth symmetry axis.

It has been found out that good results can be achieved when the dimension of the first nozzle measured along the first symmetry axis substantially corresponds to the half of the dimension of the second nozzle measure along the second symmetry axis.

To produce several structuring-beads and their corresponding sublayer-beads at the same time, it is beneficial when the extrusion die contains a plurality of equally formed pairs of nozzles that are distributed along the contact line. Depending upon the preferred design pattern, the distance between two neighboring pairs of nozzles may always be the same.

Of course, with two separately formed nozzles of a pair of nozzles in an extrusion die, it is possible to use a polymeric material for forming the sublayer-beads that differs from the polymeric material for forming the structuring-beads. For example, the polymeric material for forming the sublayer-beads may have a lower viscosity than the polymeric material for forming the structuring-beads. A lower viscosity can be beneficial to enhance the penetration of the material into the volume of the woven base fabric. However, it is rather preferred for the sake of obtaining a very good bonding, that both beads are made up from the same material. Thus, it is proposed that the first nozzle and the second nozzle are connected to a common supply chamber within the extrusion die. This also simplifies the cleaning procedure of the extrusion die.

Another aspect of the present invention concerns a method of producing a structuring fabric having at least one structuring-bead resting on at least one sublayer-bead by using the above-described extrusion die of the present invention, the method comprising the following steps:

a) providing a woven base fabric, the woven base fabric having a web facing side and a machine side,
b) extruding a sublayer-bead of polymeric material through the first extrusion nozzle of the extrusion die onto the web facing surface of the woven base fabric, wherein the sublayer-bead contains an upper foundation surface,
c) extruding a structuring-bead of polymeric material through the second extrusion nozzle of the extrusion die onto the top of the upper foundation surface of the sublayer-bead.

The term "onto" in step b) might be read as "into" since the polymeric material forming the sublayer-bead shall at least partly, preferably completely, penetrate into the woven base fabric.

No matter if the woven base fabric is a single-layer woven fabric or a multi-layer woven fabric, it contains an upper layer, that defines the web facing side of the woven base fabric. The upper layer is formed from upper cross-machine direction yarns that are interwoven with upper machine direction yarns. Preferably, the sublayer-beads extend so deeply into the woven base fabric that they create a form-fit connection with at least some of the upper cross-machine direction yarns at their deepest points, that is where these upper cross-machine direction yarns pass under the upper machine direction yarns. In other words, the sublayer-beads preferably surround the upper cross-machine direction yarns at their deepest points by more than half of their diameter to create such a form-fit connection. This leads to a very strong hold of the sublayer-beads within the woven base fabric. At the same time, it is preferred that the sublayer-beads do not extend deeper than the thickness of the upper layer into the woven base fabric, so as not to reduce the void volume of the woven base fabric too much.

Preferably, the first surface of the extrusion die is substantially parallel to the web facing surface of the woven fabric during the extrusion process, whereas the second surface of the extrusion die is inclined with respect to the web facing surface of the woven fabric during the extrusion process. This allows to ensure that the resinous material extruded through the first extrusion nozzle to form the sublayer-bead will penetrate deeper the volume of the woven base fabric.

Furthermore, the distance of the first extrusion nozzle to the web facing surface of the woven fabric is preferably larger than the distance of the second extrusion nozzle to the web facing surface of the woven fabric during the extrusion process.

To achieve a strong bonding between the sublayer-bead and the structuring-bead the structuring-bead can be extruded in step c) at a time when the sublayer-bead has not been cured yet, at least not completely. This is sometimes called "wet-in-wet" method.

Preferably, the form of the upper foundation surface of the sublayer-beads substantially corresponds to the form of a lower surface of the corresponding structuring-beads that rest thereon. In other words, the dimensional extensions of the sublayer-beads within the plane of the web facing side of the woven base fabric can be substantially the same as the dimensional extensions of the structuring-beads. That way, the structuring-beads can be fully supported by the sublayer-beads while at the same time the sublayer-beads do not or do hardly reduce permeability of the structuring fabric.

Furthermore, to provide a very good foundation for the structuring-beads it is preferred that the upper foundation surface of the sublayer-beads is substantially flat. At least the upper foundation surface of the sublayer-beads shall be significantly smoother compared to the web facing surface of the woven base fabric, which is characterized by a plurality of individual yarn knuckles.

The woven base fabric can be a single layer weave or can comprise serval layers. Preferably, the layer defining the web facing side of the woven base fabric has a plain weave pattern. In a plain weave pattern, the warp and weft yarns cross at right angles, aligned so they form a simple criss-cross pattern. Each weft yarn crosses the warp yarns by going over one, then under the next, and so on. The next weft yarn goes under the warp yarns that its neighbor went over, and vice versa. With such a weave pattern, irregularities on the web facing side of the woven base structure can already be kept small.

In thickness direction of the structured fabric, the sublayer-beads can be provided substantially within the volume of the woven base fabric. This maximizes their contact area with the yarns of the woven base fabric.

As mentioned above, to provide a well visible pattern into the fiber web produced on the structuring fabric, it is preferred that structuring-beads have a substantially rectangular cross-sectional shape. In particular, the structuring-beads may have a substantially square cross-sectional shape. The term "substantially" shall mean here that the side walls of the structuring beads do not necessarily have to be exactly flat and/or that the corners of the substantially rectangular cross-sectional shape are not allowed to be slightly rounded.

As shown and described in international patent disclosure WO 00/75424 A1 the structuring-beads can form continuous lines on the web facing surface of the woven fabric, wherein preferably the continuous lines substantially extend in machine direction of the structuring fabric. The term "substantially in machine direction" means in this context that their main extension is in machine direction and not in cross machine direction of the structuring fabric. However, the structuring-beads do not have to extend precisely as straight lines in machine direction. For example, the structuring beads may have a wavy configuration or may form a zig-zag pattern. They also may have in total a small inclination angle with respect to the machine direction of the structuring fabric. Preferably, the structuring beads do not cross each other. Instead, they can extend substantially parallel to each other. If the structuring-beads form continuous lines on the web facing surface of the woven fabric, this implies that they cannot be formed by extruding the resinous material through a rotary screen. Instead, a method known as nozzle extrusion deposition is preferably applied.

The nozzles may be stationary while the woven base fabric is moved in machine direction of the structuring fabric to be produced. This will result in a pattern of straight lines extending in machine direction. If the pattern shall be a zig-zag configuration or a wavy configuration, the nozzles may be movable in cross machine direction during the manufacturing process. An example is illustrated in FIG. 4 of WO 00/75424 A1.

As mentioned above, good results as to the shape of the extruded beads are achievable if the polymeric material extruded through the first extrusion nozzle to form the sublayer-bead and/or the polymeric material extruded through the second extrusion nozzle to form the structuring-bead is a silicone, in particular a two-component silicone. Preferably, the same material is extruded through the first extrusion nozzle and the second extrusion nozzle to achieve a good bonding between the sublayer-bead and the structuring-bead.

However, it is also possible that the polymeric material extruded through the first extrusion nozzle to form the sublayer-bead and/or the polymeric material extruded through the second extrusion nozzle to form the structuring-bead is a polyurethane.

In another embodiment of the present invention, the polymeric material extruded through the first extrusion nozzle to form the sublayer-bead and/or the polymeric material extruded through the second extrusion nozzle to form the structuring-bead is an acrylic material, in particular a U.V. curable acrylic material.

In that embodiment, the acrylic material, comprises at least one of the following components: N,N-Dimethylacrylamide; 2-Propenoic acid, 2-hydroxyethyl ester, polymer with 5-isocyanato-1-(isocyanatomethyl)-1,3,3-trimethylcyclohexane; Isobornyl acrylate; 2-(2-Ethoxyethoxy)ethyl acrylate; diphenyl(2,4,6-trimethylbenzoyl)phosphine oxide; [3-(2,3-Epoxypropoxy)propyl]trimethoxysilane; acrylic acid; 2-Hydroxyethyl acrylate, wherein preferably none of the components contributes with more than 50 weight-% to the composition of the acrylic material.

Other features which are considered as characteristic for the invention are set forth in the appended claims.

Although the invention is illustrated and described herein as embodied in an extrusion die for making a structuring fabric, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 2:
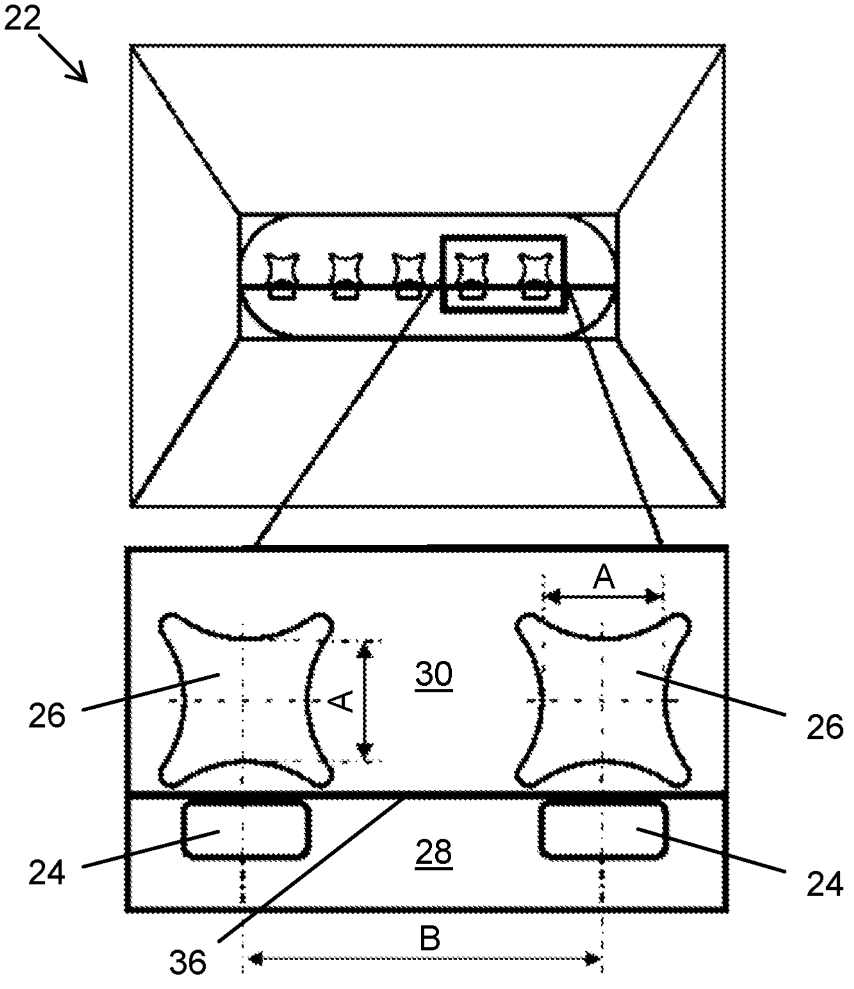
FIG. 2 is an illustration showing an extrusion die according to the invention, with several pairs of first and second nozzles to extrude sublayer-beads and corresponding structuring-beads on top thereof.
Figure 4:
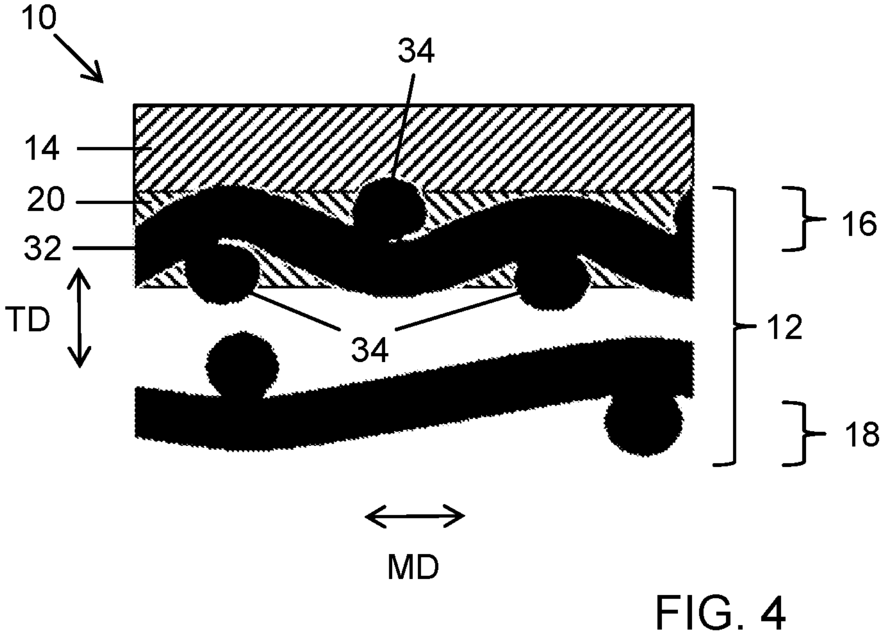
FIG. 4 is a cross-sectional view of a portion of the structuring fabric produced with the extrusion die according to the present invention.

Referring now to the figures of the drawings in detail and first, particularly to FIG. 2 thereof, there is shown an extrusion die 22 according to the present invention and adapted to simultaneously apply several structuring-beads 14 and corresponding sublayer-beads 20 onto a web facing side 16 of a woven base fabric 12 (see FIG. 4). More precisely, the extrusion die 22 contains five pairs of first nozzles 24 and second nozzles 26, to extrude five pairs of sublayer-beads 20 and structuring-beads 14, respectively. For the sake of clarity, two pairs of first nozzles 24 and second nozzles 26 are shown in an enlarged view on the bottom of FIG. 2. The first nozzles 24 for extruding the sublayer-beads 20 have a substantially rectangular form, whereas the second nozzles 26 for extruding the structuring-beads 14 have a shape that resembles a square with all four side edges bulged inwardly. The smallest distance between two opposite inwardly bulged side edges is designated here with letter "A". This smallest distance A is preferably between 0.3 mm and 1.0 mm, more preferably between 0.6 mm and 0.8 mm. The first, substantially rectangular shaped nozzle 24 has a width that substantially corresponds to the smallest distance A of the second nozzle 26. The length of the first, substantially rectangular shaped nozzle 24 is significantly smaller than its width. It is substantially only half of the width, i.e. half the smallest distance A of the second nozzle 26.

The pitch of two directly neighboring pairs of first nozzles 24 and second nozzles 26 is "B". The pitch B is measured as the distance from the center of one second nozzle 26 to the center of one of its directly neighboring second nozzles 26. The pitch B is preferably between 2 and 6 times the smallest distance A between two opposite curved lateral edges of the first, substantially rectangular shaped nozzle 24.

The first nozzles 24 are provided within a substantially flat first surface 28, whereas the second nozzles 26 are provided within a substantially flat second surface 30. The first surface 28 and the second surface 30 do not lie within the same plane. In other words, the second surface 30 is inclined with respect to the first surface 28. The first surface 28 and the second surface 30 contact each other along a contact line 36. The first nozzles 24 and the second nozzles 26 are both in close proximity to the contact line 36 without touching each other.

Figure 3:
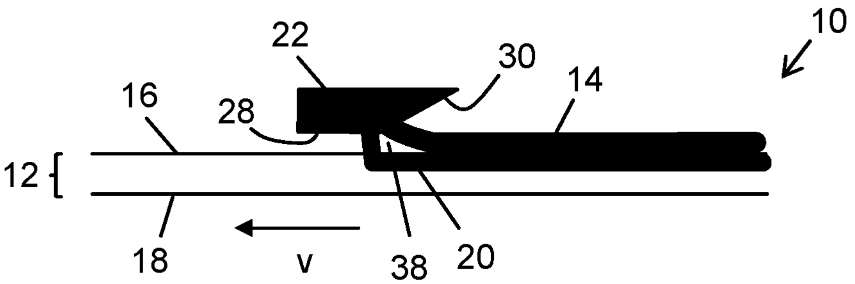
FIG. 3 is an illustration showing a manufacturing process for producing the structuring fabric by using the extrusion die according to the present invention.

As shown in FIG. 3, during the manufacturing process of the structuring fabric 10, the first surface 28 of the extrusion die 22 is placed close and substantially parallel to the web facing side 16 of the woven base fabric 12. This allows resinous material extruded through the first nozzles 24 to easily penetrate the volume of the woven base fabric 12, so as to form sublayer-beads when the woven base fabric 12 is carried in moving direction v, preferably corresponding to the machine direction MD of the structuring fabric 10, below the extrusion die 22.

The resinous material extruded through the second nozzles 26 formed in the second surface 30 of the extrusion die 22 then forms the structuring-beads 14 that rest upon the upper foundation surface of the corresponding sublayer-beads 20. The inclination of the second surface 30 with respect to the first surface 28 and, thus, with respect to the web facing side 16 of the woven base fabric, helps to form substantially square shaped structuring-beads 14. The close proximity of the first nozzle 24 and the second nozzle 26 results in a very small gap 38 between the sublayer-bead 20 and the structuring-bead 14. Thus, little or even no air will be trapped between the two beads 20, 14, resulting in a very good bonding.

During the manufacturing process of the structuring fabric 10, the extrusion die 22 may be stationary while the woven base fabric 12 moves in moving direction v, so as to form a pattern of structuring-beads 14 that extend in parallel straight lines. However, if it is preferred to provide the structuring fabric 10 with another pattern of structuring-beads 14, such as a zig-zag pattern or a wavy pattern, the extrusion die 22 may be moved, e.g. back and forth, orthogonally to the moving direction v during the manufacturing process, i.e. orthogonally to the image plane of FIG. 3.

Figure 1A:
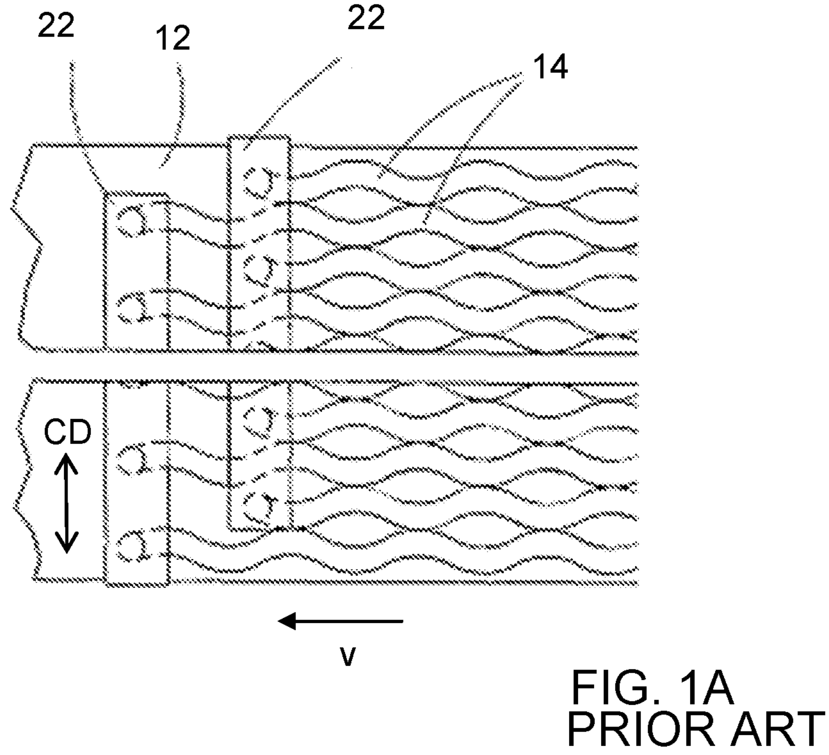
FIG. 1A is an illustration showing two extrusion dies according to the prior art.
Figure 1B:
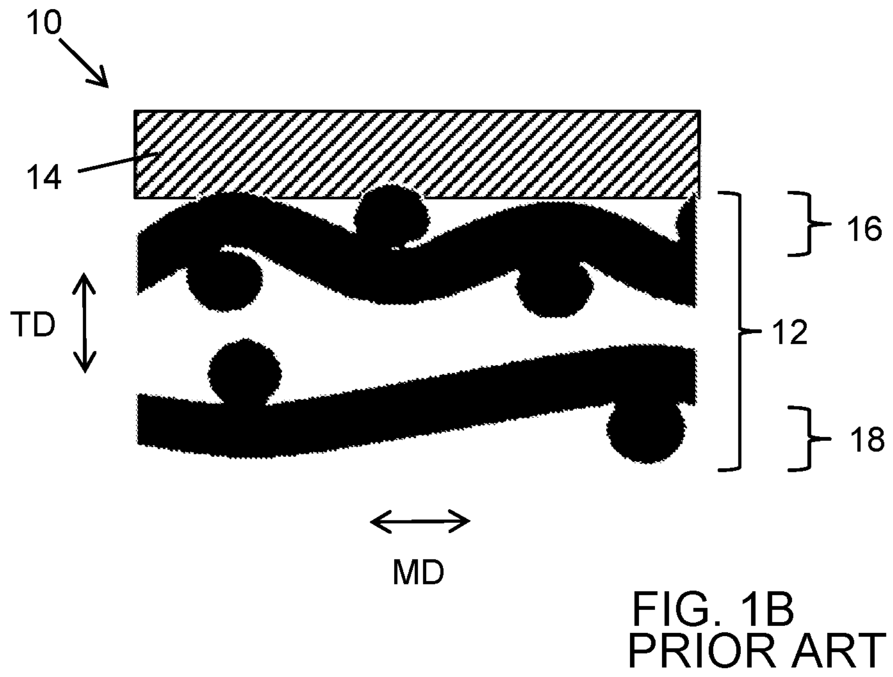
FIG. 1B is a cross-sectional view of a portion of a structuring fabric known from the prior art.

FIG. 4 shows in cross-section a portion of a structuring fabric 10 manufactured with an extrusion die 22 according to the present invention. FIG. 4 resembles FIG. 1B showing a corresponding portion of a structuring fabric known from the prior art, as described above. Therefore, the same reference signs are used for the same features, and it is referred to the description of FIG. 1B above regarding these features. In the following, only the differences between the embodiments of FIG. 1B and FIG. 4 will be explained.

In contrast to the prior-art embodiment of FIG. 1B, in the embodiment of FIG. 4, the structuring-bead 14 does not only have a limited local contact with the yarn knuckles that characterize the web facing side 16 of the woven base fabric 12 but the structuring-bead 14 rests with its lower surface on an upper foundation surface of a sublayer-bead 20. The sublayer-bead 20 is formed preferably completely within the volume of the woven base layer 12, thus having a strong bond to the woven base layer 12. Its upper foundation surface, i.e. its surface that is facing away from the machine side 18 of the woven base layer 12, is substantially flat, thereby providing a very good foundation for the structuring bead 14 resting thereon. In thickness direction TD of the structuring fabric 10, the dimension of the sublayer-bead 20 may be smaller than the dimension of the structuring-bead 14. In the present embodiment, the woven base fabric 12 is formed as a multi-layer woven fabric but it could also be a single-layer woven fabric. The upper layer, that defines the web facing side 16 of the woven base fabric 12 is preferably a plain weave. The upper layer is formed by upper machine direction yarns 32 interwoven with upper cross-machine direction yarns 34. The sublayer-bead 20 extends so deep into the woven base fabric 12 as to create a form-fit connection with the upper cross-machine direction yarns 34 where these upper cross-machine direction yarns 34 pass under the machine direction yarns 34. In other words, the polymeric material of the sublayer-bead 20 surrounds more than half of the diameter of the upper cross-machine direction yarns 34 at their lowest points. At the same time, the sublayer-bead 20 does not extend deeper into the woven base fabric 12 than the thickness of the upper layer. In thickness direction, the sublayer-bead 20 is almost as thick as the structuring-bead 14 resting thereon.

In the present embodiment, the knuckles on the web facing side 16 of the woven fabric only slightly project above the substantially flat upper foundation surface of the sublayer-bead 20. The sublayer-bead 20 and the structuring-bead 14 are preferably formed from the same polymeric material, such as a two-component silicone. This results in a strong bond between the two beads, especially if the structuring-bead 14 is applied on top of the sublayer-bead 20 at a time when the material of the sublayer-bead 20 has not been cured yet.

The following is a summary list of reference numerals and the corresponding structure used in the above description of the invention.

REFERENCE SIGNS

10 structuring fabric
12 woven base fabric
14 structuring-bead
16 web facing side
18 machine side
20 sublayer-bead
22 extrusion die
24 first nozzle
26 second nozzle
28 first surface
30 second surface
32 upper machine direction yarns
34 upper cross-machine direction yarns
36 contact line
38 gap
A smallest distance between two opposite curved lateral edges
B pitch of two directly neighboring pairs of first and second nozzles
CD cross machine direction
MD machine direction
TD thickness direction
v moving direction

The invention claimed is:

1. An extrusion die for making a structuring fabric having structuring-beads resting on sublayer-beads, the extrusion die comprising:

a substantially flat first surface; and a substantially flat second surface, said substantially flat first surface and said substantially flat second surface contacting each other along a substantially straight contact line and said substantially flat first surface and said substantially flat second surface being inclined with respect to each other;

said substantially flat first surface containing a first nozzle of a pair of nozzles for extruding a sublayer-bead and said substantially flat second surface containing a second nozzle of said pair of nozzles for extruding a structuring-bead on top of said sublayer-bead;

said first nozzle having a substantially rectangular shape and said second nozzle having a shape that resembles a square with all four side edges bulged inwardly, and both, said first nozzle and said second nozzle being disposed in close proximity to said contact line;

said first nozzle having a first symmetry axis that is perpendicular to said contact line, said second nozzle having a second symmetry axis that is perpendicular to said contact line, and the first symmetry axis and the second symmetry axis contacting each other directly at said contact line.

2. The extrusion die according to claim 1, wherein a distance of said first nozzle to said contact line is smaller than 10% of a dimension of said first nozzle measured along the first symmetry axis and/or wherein a distance of said second nozzle to said contact line is smaller than 10% of a dimension of said second nozzle measured along the second symmetry axis.

3. The extrusion die according to claim 1, wherein said first nozzle has a third symmetry axis that is parallel to said contact line and wherein said second nozzle has a fourth symmetry axis that is parallel to said contact line.

4. The extrusion die according to claim 3, wherein a dimension of said first nozzle measured along the third symmetry axis substantially corresponds to a dimension of said second nozzle measured along the fourth symmetry axis.

5. The extrusion die according to claim 1, wherein a dimension of said first nozzle measured along the first symmetry axis substantially corresponds to a half of a dimension of said second nozzle measured along the second symmetry axis.

6. The extrusion die according to claim 1, wherein a dimension of said second nozzle measured along the second symmetry axis is between 60% and 80% of a largest dimension of said second nozzle measured along a line that is parallel to the second symmetry axis.

7. The extrusion die according to claim 1, further comprising a plurality of equally formed pairs of nozzles that are distributed along said contact line.

8. The extrusion die according to claim 1, further comprising a common supply chamber, said first nozzle and said second nozzle are connected to said common supply chamber within the extrusion die so as supply a same material to both said first and second nozzles.

* * * * *